United States Patent [19]

Kahn

[11] 4,311,877
[45] Jan. 19, 1982

[54] METHOD AND MEANS FOR IMPROVING THE RELIABILITY OF SYSTEMS THAT TRANSMIT RELATIVELY WIDEBAND SIGNALS OVER TWO OR MORE RELATIVELY NARROWBAND TRANSMISSION CIRCUITS

[76] Inventor: Leonard R. Kahn, 137 E. 36th St., New York, N.Y. 10016

[21] Appl. No.: 116,231

[22] Filed: Jan. 28, 1980

Related U.S. Application Data

[63] Continuation-in-part of Ser. No. 105,248, Dec. 19, 1979, abandoned.

[51] Int. Cl.³ ............................................. H04B 1/66
[52] U.S. Cl. ........................ 179/15.55 R; 340/825.01; 455/59; 455/69; 371/11
[58] Field of Search ................................... 370/16, 69; 179/179.3 S, 15.55 R; 340/147 SC, 147 R; 455/50, 52, 59, 62, 67, 68, 69, 70; 332/41; 371/83, 36, 11; 364/200 MS File, 900 MS File

[56] References Cited

U.S. PATENT DOCUMENTS

| | | | |
|---|---|---|---|
| 3,684,838 | 8/1972 | Kahn | 179/15.55 R |
| 3,696,298 | 10/1972 | Kahn et al. | 179/15.55 |
| 3,715,503 | 2/1973 | Jungbluth et al. | 370/16 |
| 4,011,542 | 3/1977 | Baichtal et al. | 340/147 SC |
| 4,017,828 | 4/1977 | Watanabe et al. | 371/8 |
| 4,018,996 | 4/1977 | Kahn | 179/84 VF |

OTHER PUBLICATIONS

Kahn, "Specifications, Line Guard, No. LG-6", Kahn Communications, Inc., 1976.

*Primary Examiner*—Mark E. Nusbaum
*Assistant Examiner*—E. S. Kemeny

[57] ABSTRACT

A system for use with equipment designed for transmitting a relatively wideband signal over two or more relatively narrowband circuits so as to provide good overall system reliability even though the relability of the individual narrowband circuits is poor.

18 Claims, 4 Drawing Figures

METHOD AND MEANS FOR IMPROVING THE RELIABILITY OF SYSTEMS THAT TRANSMIT RELATIVELY WIDEBAND SIGNALS OVER TWO OR MORE RELATIVELY NARROWBAND TRANSMISSION CIRCUITS

CROSS REFERENCE TO RELATED APPLICATIONS

This application is a continuation-in-part of my copending application Ser. No. 105,248, now abandoned entitled Method and Means for Improving The Reliability Of Systems That Transmit Relatively Wideband Signals Over Two or More Relatively Narrowband Transmission Circuits filed Dec. 19, 1979.

My related application Ser. No. 621,669 now U.S. Pat. No. 4,217,661 entitled Audio Signal Transmission System and Method Incorporating Automatic Frequency Correction filed Oct. 14, 1975 in general relates to systems for the transmission of relatively wideband signals over two or more relatively narrowband lines.

BACKGROUND OF THE INVENTION

While the invention is subject to a wide range of applications, it is especially suitable for use with a system for transmitting relatively wideband audio signals, such as 50 Hz to 5,000 Hz voice waves, through two narrowband toll grade lines having, typically, a frequency response of 300 Hz to 3,000 Hz.

There are a number of methods for accomplishing such transmission; for example, Kahn and Gordon U.S. Pat. No. 3,696,298 and Kahn patent application Ser. No. 621,669, now U.S. Pat. No. 4,217,661. Such systems are often implemented with common dial telephone circuits which are prone to failure, especially if used to transmit descriptions of ballgames which continue for extended periods and which must be transmitted over long distances through numerous switching systems, repeaters, etc. One source of unreliability of many dial telephone circuits is the vulnerability of inband signalling circuits. For example, the 2,600 Hz signalling circuit can be falsely activated by certain sounds in speech, such as sibilants. The 2,600 Hz signalling circuit is used to "hang-up" a telephone circuit and ready it for use by a new subscriber. Accordingly, false operation of the 2,600 Hz inband signalling circuit can catastrophically effect a system transmitting information over such narrowband circuits. U.S. Pat. No. 4,018,996 describes a means for greatly reducing such failures.

Another means for upgrading system reliability is to provide redundant circuits and use "voting" circuitry to switch to an alternate line whenever necessary. Voting type equipment is available commercially (Kahn Communications, Inc., Garden City, New York, Line Guard equipment, model LG-2) that monitors two or more circuits transmitting essentially identical signals. By comparison of certain characteristics of the received signals, the equipment can cause associated equipment to switch from a defective or marginal circuit to another circuit providing better performance. However, such equipment is expensive and requires spare communication circuits in order to provide the desired protection against system failure.

While the invention is subject to a wide range of applications, it is especially suited for transmission of broadcast programs from remote sites to broadcast studios and will be particularly described in that connection.

SUMMARY OF THE INVENTION

It is an object of the present invention to provide an improved method and means for reducing system failure in a system for transmitting signals from one site to another site using transmission circuits having unsatisfactory reliability characteristics.

It is a further object to allow the use of two or more poor reliability narrowband circuits to transmit relatively wideband signals with a high degree of system reliability.

It is another object of the instant invention to provide visual indication that a line has failed and needs replacement.

This invention may be used with systems wherein a single transmitter transmits signals to one receiver or to a number of receivers servicing, for example, a network of broadcast stations.

One preferred embodiment of the invention would comprise means for segmenting a voice wave covering, for example, a frequency range of 50 Hz to 5,000 Hz into two frequency segments say 50 Hz to 2,500 Hz and 2,500 Hz to 5,000 Hz and transmitting the two segments over two relatively narrowband circuits having a capability of transmitting say 300 Hz to 3,000 Hz to some remote site. Of course, if greater frequency response (say up to 7,500 Hz) is desired two wider circuits may be used or three or more narrowband circuits may be used.

To improve overall system reliability it is desirable to protect the system against 2,600 Hz inband signalling errors by use of U.S. Pat. No. 4,018,996. However, there are, unfortunately, numerous other causes of line failure.

One basic point is that if systems using two or more relatively narrowband circuits to transmit quality greater than toll circuit quality (approximately 300 Hz to 3,000 Hz) are properly designed, only a failure of one transmission circuit will severely degrade the transmission of intelligible speech. For example, if the system is designed with frequencies between, say 50 Hz and 2,500 Hz passing through a first transmission circuit or line and frequencies between 2,500 Hz and 5,000 Hz passing through the second line, there will be little loss of intelligibility if the second transmission circuit fails. However, loss of the first transmission circuit would be catastrophic.

The present invention provides methods and means to further improve reliability by detecting failures in the operation of said first line and to activate line switching means at both the transmitter and the receiver so as to switch transmission of the high intelligibility components of the signal through another line providing intelligible speech transmission. The detection of the failure and the activation of the transmitter and receiver line switching circuits should be designed to provide rapid corrective measures (say in less than one second) to avoid serious interruptions of service.

Also, in some embodiments of the invention, alarm signals are provided indicating line failure so that operators may initiate corrective measures to promptly restore full overall circuit quality. Furthermore, automatic dialing equipment may be provided which is activated whenever a line becomes defective and thus automatically restores full quality service.

The above stated objects and other objects, features, characteristics, and advantages of the systems and methods of the invention, will be apparent from the following description of certain typical forms thereof taken together with accompanying drawings.

DESCRIPTION OF THE PREFERRED EMBODIMENT

Figure 1:
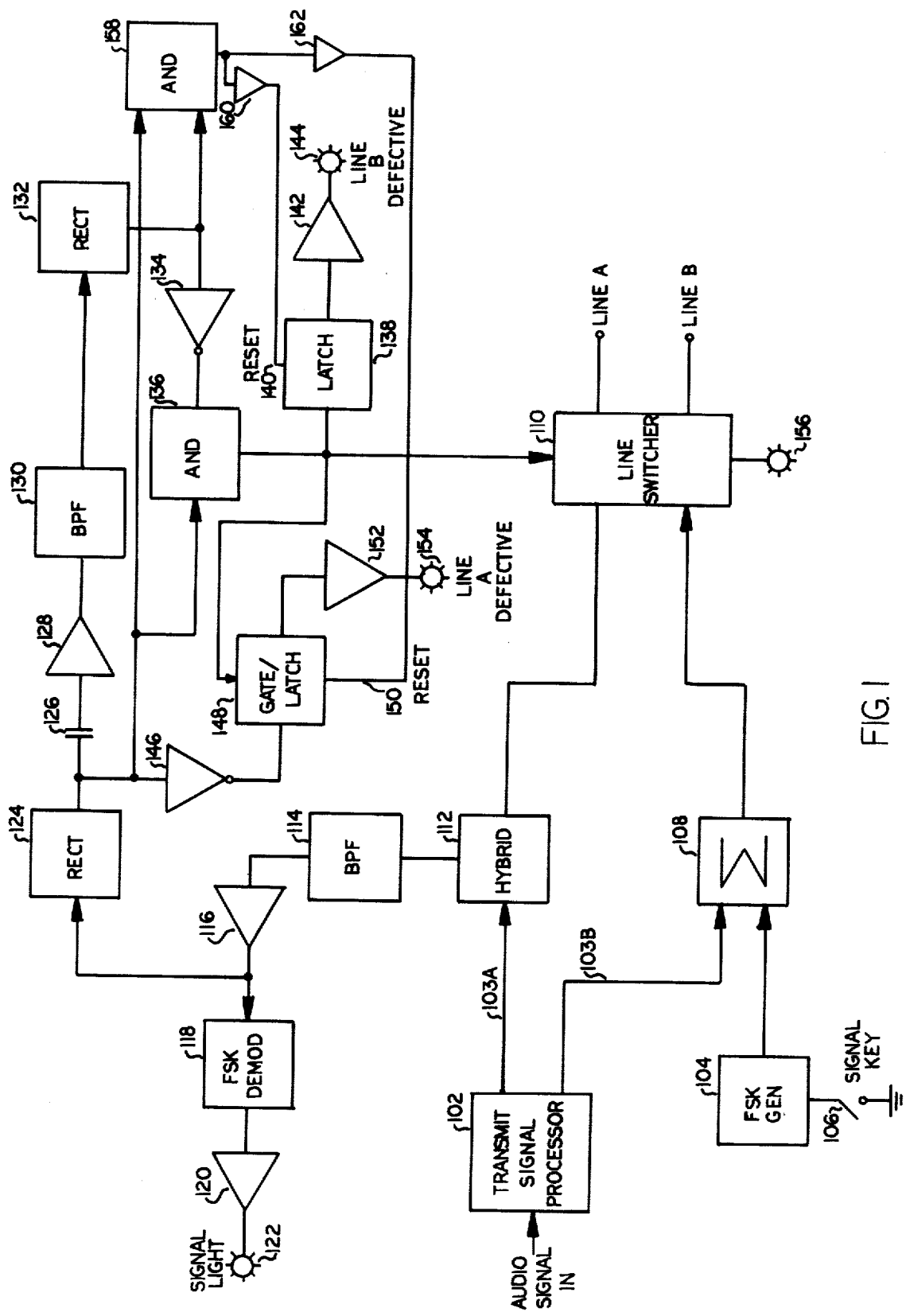
FIG. 1 is a block diagram of a transmitter which may be used in one embodiment of the instant invention.

The signal to be transmitted is fed to transmit audio processor 102. This device processes the signal so as to divide the signal wave into two or more segments having bandwidths suitable for transmission over relatively narrow bandwidth lines. For example, an audio signal covering a frequency range of 50 Hz to 5,000 Hz may be transmitted over two relatively narrowband transmission circuits, having bandwidths of 300 Hz to 3,000 Hz. Methods and means for accomplishing this have been described in U.S. Pat. No. 3,696,309 and patent application Ser. No. 621,669.

Block 102 may be constructed in conformity with these disclosures as long as one of the segments contains at least the majority of the high intelligibility components of most common speech waves.

The portion of the signal containing high intelligible components appears on line 103B and the portion of the signal appearing on line 103A provides better sound quality but does not greatly enhance intelligibility.

For example, if the teachings of patent application Ser. No. 621,669 are followed, line 103A will carry a wave representing components above about 2,500 Hz to approximately 5,000 Hz and line 103B will carry components from approximately 50 Hz to 2,500 Hz. In many applications of the present invention, the frequency response need not be free of the cuts or holes that application Ser. No. 621,669 avoids. Accordingly, the present invention may be practiced with or without much of the circuitry described in Ser. No. 621,669 and just use the frequency translation and the associated filter circuitry shown therein. It is also possible to use the system described in U.S. Pat. No. 3,684,383 to improve the low frequency response of the system and only use the frequency translation procedures of application Ser. No. 621,669 for high frequency components.

The high intelligibility componets on line 103B are fed to summation circuit 108. Also fed to block 108 is an FSK (Frequency Shift Keying, PSK (Phase Shift Keying)), unkeyed tone or any other keyed or unkeyed wave suitable for frequency division multiplexing with the high intelligible component segment. The term "angular keyed signal" is used herein and in the appended claims to describe any keyed wave which theoretically has a constant amplitude envelope. This definition would include FSK and PSK waves. The use of an angular keyed wave allows the transmission of slow speed keying so as to provide an additional intelligence path. However, if this additional communications facility is unnecessary, block 104 need only be an oscillator and signal key 106 need not be provided.

In FIG. 1 the angular keyed signal is provided by FSK generator 104 which is keyed by signal key 106. The FSK generator 104 may use an SE566N IC as manufactured by Signetics Corporation, Sunnyvale, Calif. The key 106 may be a simple push-button switch located on the front panel of the equipment so that it can be conveniently hand keyed. When this switch is pushed, the FSK generator 104 is caused to shift frequency to the mark frequency from its space or rest frequency. Typically, the mark frequency would be 320 Hz and the space frequency 300 Hz. This keyed wave is then fed to summation circuit 108 which in turn feeds line switcher 110.

The signal components appearing on line 103A are fed to hybrid circuit 112. The hybrid block is used to isolate incoming and outgoing signals on a two-wire two-way telephone system. Such circuits are well known to those skilled in the telephony art. For example, see Transmission Systems for Communications, 4th Edition, Bell Telephone Laboratories, pages 25–27. The signal components are caused to pass to one port of line switcher 110.

Hybrid block 112 also feeds a wave from the line to bandpass filter 114 which selects the FSK wave generated in the companion receiver and attenuates noise and interference. It should be centered and have sufficient bandwidth so as to pass at least the fundamental keying sidebands. For a typical application, wherein the space frequency is 300 Hz and the mark frequency is 320 Hz and slow hand keying is employed, the 3 db band limits should be approximately 290 Hz to 330 Hz.

This FSK wave is generated at the far end, receiver terminal, of the associated line. The output of filter 114 feeds amplifier 116. The output from amplifier 116 feeds FSK demodulator 118. Demodulator 118 has two conditions, one representing the received mark frequency and the other representing the received space frequency. An IC suitable for use as an FSK demodulator is an SE565N made by Signetics Corporation, Sunnyvale, Calif. This demodulated wave feeds amplifier 120 which in turn causes signal light 122 to glow when mark waves are received and not glow for space waves.

Under normal operating conditions, with both Lines A and B operating satisfactorily, the output of Rectifier 124 is a tone superimposed on a positive dc voltage. The dc is derived from rectification of the FSK wave and the tone is derived from the envelope modulation of the FSK wave. If the line carrying the high intelligibility portion of the signal fails, the envelope modulation will be removed at the receiver, leaving the positive dc wave, while if the other line fails, both the tone and the dc voltage disappears. Thus, the system is capable of determining whether Line A or Line B failed.

The tone is coupled from the Rectifier 124 to amplifier 128 through capacitor 126. The tone is isolated from noise by bandpass filter 130 which is tuned to the frequency of the tone which may be, for example, 15 Hz. The tone is then rectified by 132 which is preferably a full wave rectifier producing a positive dc voltage when tone is present and zero voltage when it is absent. Inverter 134 inverts the output of rectifier 132 producing a positive voltage when the tone is absent and zero voltage when the tone is present.

Inverter 134 feeds AND circuit 136 which is also fed by rectifier 124. The AND circuit only produces an output when rectifier 124 is fed a signal and rectifier 132 is not fed a tone. This is the condition which occurs when the line carrying the high intelligibility portion of the signal fails.

The output of the AND gate is fed to the line switcher 110, switching the segments fed to the two lines so as to send the high intelligibility portion of the signal through the line that is properly functioning. Until the defective line (assumed to be Line B) is repaired, the received signal will be of reduced quality but at least it will be intelligible.

AND circuit 136 is also connected to Latch circuit 138 which produces a dc voltage output upon receiving a positive voltage from the AND circuit and maintains or latches to that voltage even after the AND circuit stops producing a positive voltage. The latch circuit may be turned off and made ready for its next operation by manually or automatically resetting it by activating connection 140.

The automatic reset circuitry is described below:

Latch circuit 138 feeds amplifier 142 which in turn feeds current to lamp 144.

Rectifier 124 also feeds an inverter 146, which in turn feeds gate 148, passing dc voltage through the gate upon loss of Line A (the line assumed to carry the low intelligibility segment of the signal). The gate normally passes the input from the inverter to amplifier 152 which in turn provides current for lamp 154 when line A fails.

However, if Line B fails, Line Switcher 110 will cause the return signal to disappear and without proper circuitry would cause a false indication of Line A failure. One method for avoiding such a problem is to connect the output of AND circuit 136 to Gate 148 opening the gate when the AND circuit indicates Line A failure. In this manner the Line A failure indicator is guarded against false operation.

FIG. 1 shows one possible arrangement for automatically resetting gate/latch block 148 and latch circuit 138. By resetting these blocks whenever Lines A and B are both in service, the normal operation of lights 144 and 154 is restored. However, the light relationships with Lines A and B are interchanged every other operation of line switch 110. As described below, in the discussion of FIG. 4, switching circuitry can be provided for switching light controls in accordance with the condition of line switcher 110. It is also possible to determine the proper line markings of lights 144 and 154 by noting whether or not light 156 is glowing.

The operation of the automatic resetting circuitry is as follows: If both are operational, the resetting circuit should be activated. AND circuit 158 will produce a positive voltage if, and only if, the outputs of rectifiers 124 and 132 are positive, indicating both lines are passing the narrowband signals. The output of AND gate feeds isolation amplifiers 160 and 162 which reset latch 138 by reset lead 140 and gate/latch 148 by reset lead 150 respectively. In many cases, isolation amplifiers 160 and 162 may be deleted.

The above description assumes the use of an analog gate as part of gate/latch block 148 and also gate 138 of FIG. 1. In some applications of this system, blocks 148 and 138 may both use digital gates providing only two conditions of output voltage. However, in other applications it is useful to implement these blocks, especially block 148, with analog gates so that the light intensity of lamp 154 is a function of received FSK signal level. This allows the user of the equipment to more readily make adjustments, say in the gain of amplifier 116, without recourse to a meter. Also, the analog circuits allows the user to detect reductions in return FSK line level before the level drops to a point where operation is degraded.

Figure 2:
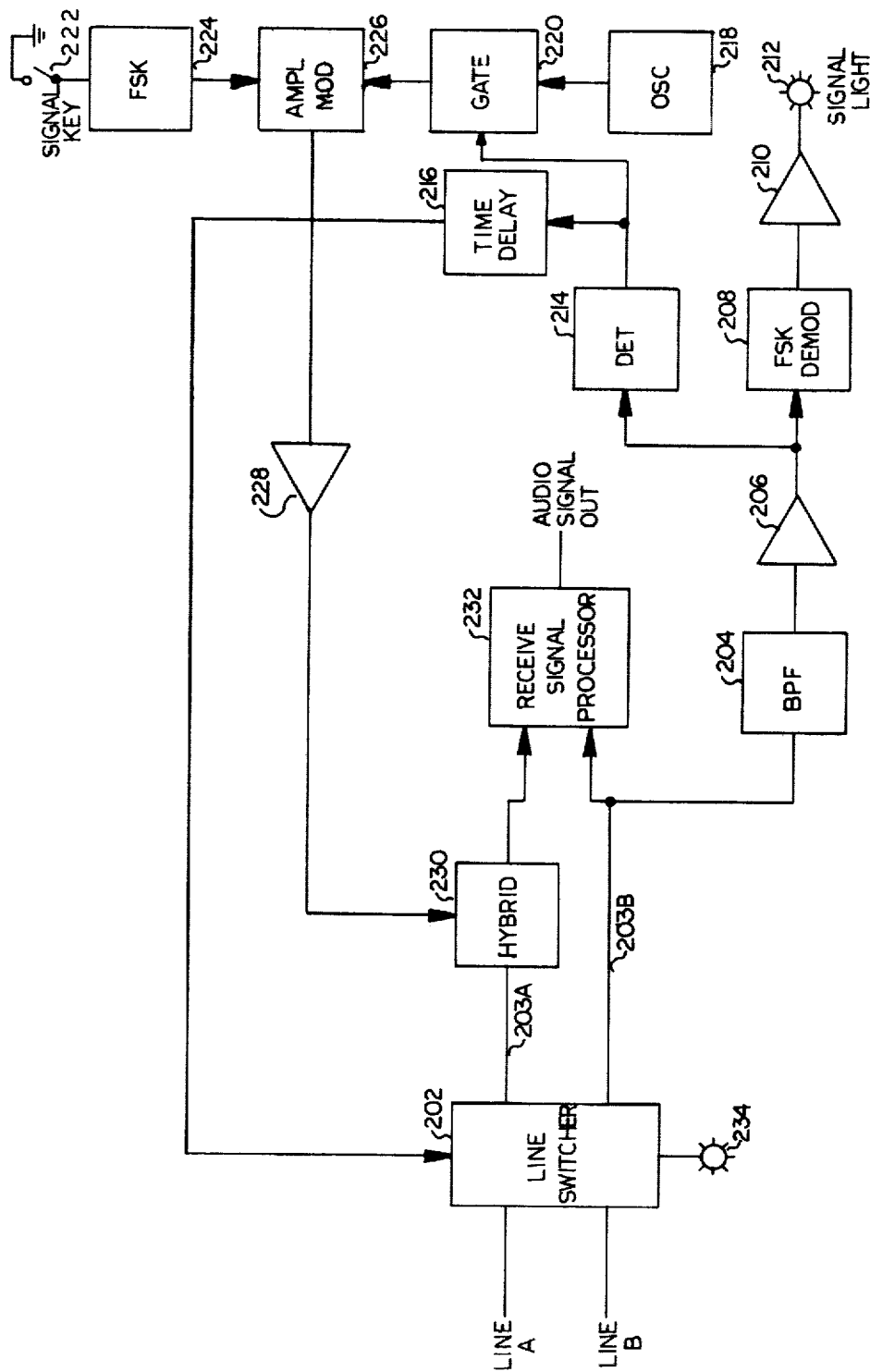
FIG. 2 is a block diagram of one embodiment of a receiver which may be used in conjunction with the transmitter shown in FIG. 1.

FIG. 2 shows, in block form, a receiver unit suitable for receiving the waves produced by the transmitter shown in FIG. 1. Lines A and B deliver the signal segments and these two lines are connected to line switcher 202 which causes the lines to switch whenever the lines are switched at the transmitter. Output 203B carries the high intelligibility portion of the speech and these components are fed to the receive signal processor 232 where they are processed and combined with the processed components from line 203A to reconstruct a wave closely resembling the input signal fed to the transmitter. Circuitry for accomplishing this is described in detail in patent application Ser. No. 621,669.

Line 203B also feeds bandpass filter 204 which passes the narrowband keyed wave, such as an FSK or PSK wave, generated in the transmitter's block 104 but attenuates the main signal components.

The received FSK wave is amplified in amplifier 206 and then demodulated in FSK demodulator 208. The FSK demodulator may be of the same basic design as block 118 of FIG. 1. The resulting demodulated keyed wave is fed to an amplifier 210 which provides current to cause signal light 212 to glow during reception of a mark signal. Light 212 may be an LED lamp.

The received FSK signal is also used to provide information as to the condition of the line carrying the important high intelligibility components of speech. If the FSK signal is missing, and if the equipment is properly functioning, it can be assumed that the line is defective and the lines should be switched so as to avoid continued loss of the high intelligibility components of the signal. Accordingly, the presence of the FSK signal, besides providing signalling between transmitter and receiver, provides control information for the line switching circuitry. (Actually, in most cases, the improved circuit reliability offered by this invention is of much greater value to the user than the signalling capability. Accordingly, in applications where the keying is not important to the user, a single tone may be transmitted and the FSK demodulator 208, amplifier 210, and signal light 212 may be deleted.)

The output of amplifier 206 feeds detector 214 which controls gate 220.

Thus, if the communications circuit carrying the high intelligibility signal components fails, the FSK signal generated at the transmitter will not be received and gate 220 will be opened and oscillator 218 output will not reach amplitude modulator 226. Thus, the second FSK signal (generated in receiver block 224) will not be envelope modulated when the line, carrying the high intelligibility components, fails. Conversely, if the line is operating properly, gate 220 will be closed passing the 15 Hz tone generated by oscillator 218, to block 226 so as to cause envelope modulation of the FSK wave originating in block 224. FSK generator 224 may be keyed by switch or "key" 222 to allow signalling from the receiver to the remotely located transmitter.

The FSK signal generator and its associated signal key 222 may use the same design and operate with the same mark and space frequencies at FSK generator 104 and signal key 106 of FIG. 1. One possible set of mark and space frequencies would be 320 Hz and 300 Hz. These frequencies are merely provided as an example and it should be noted that numerous other combinations would be acceptable.

It is also possible to use on/off keying in either the transmitter's or receiver's keying generators and associated demodulators with the quiescent condition being the "on" keyed state. On/off keying equipment is less expensive than FSK. However, the speed of switching lines, when a failure occurs in the line carrying the high intelligibility components of the audio signal, is somewhat compromised as the response time must be longer than the longest "off" keying condition.

Amplitude modulator 226 may be a conventional low powered modulator producing center frequency components; i.e., the FSK mark and space components surrounded by sideband components above and below the center components by a frequency equal to the operating frequency of oscillator 218. For example, under steady frequency operation of, for example 300 Hz, and assuming oscilator 218 operates at a frequency of 15 Hz the output of amplitude modulator 226 would be 300 Hz plus amplitude modulation side frequencies of 285 and 315 Hz. Similarly, for this example, a steady mark condition would produce a 320 Hz wave plus amplitude modulation side frequencies of 305 Hz and 335 Hz. The side frequencies would only be present when the line carrying the high intelligibility components is operating and side frequencies disappear upon line failure. The amount of modulation; ie, percentage modulation used, is not critical, but in order to more easily sense the envelope modulation a high degree of modulation will generally be preferred. Also, it is possible for an on/off keying type of envelope modulation to provide the emergency information although this type of amplitude modulation creates a wider spectrum.

Normally it is best to use the absence of amplitude modulation to indicate the presence of the emergency condition. While in the original application, upon which this CIP is based, it was believed best to follow the reverse conditions, further consideration and recognition of the extreme importance of failure free operation has lead to this change in selection of the preferred mode of operation. Since a failure in the blocks 218 or other blocks required in the generation and detection of the envelope modulation component would not be noticed until there was a line failure (if absence of envelope modulation represented normal operation), when it would be too late to avoid an interruption, is is now believed that superior performance can be expected from the above described mode of operation. Accordingly, most engineers will find that the presence of envelope modulation to represent the condition of normal line operation is the preferred arrangement.

The output of amplitude modulator is amplified in block 228 which in turn feeds a port of the hybrid circuit 230 which in turn is connected through line switcher 202 to the line carrying the lower intelligibility sounds of the audio signal from the transmitter to the receiver.

Detector 214 of FIG. 2 also feeds a time delay circuit 216. This circuit may be a simple R/C circuit with the resistor causing a slow buildup in the charge of the capacitor. The result is a delay in producing sufficient control voltage to cause line switcher 202 to operate. As an example, 216 provides a delay of 500 ms. This allows time for gates 220 to pass audio to amplitude modulator 226, causing transmission of the emergency condition signal to the transmitter where it can be detected so as to cause Line Switcher 110 to switch lines prior to operation of the receiver's line switcher 202.

Figure 3:
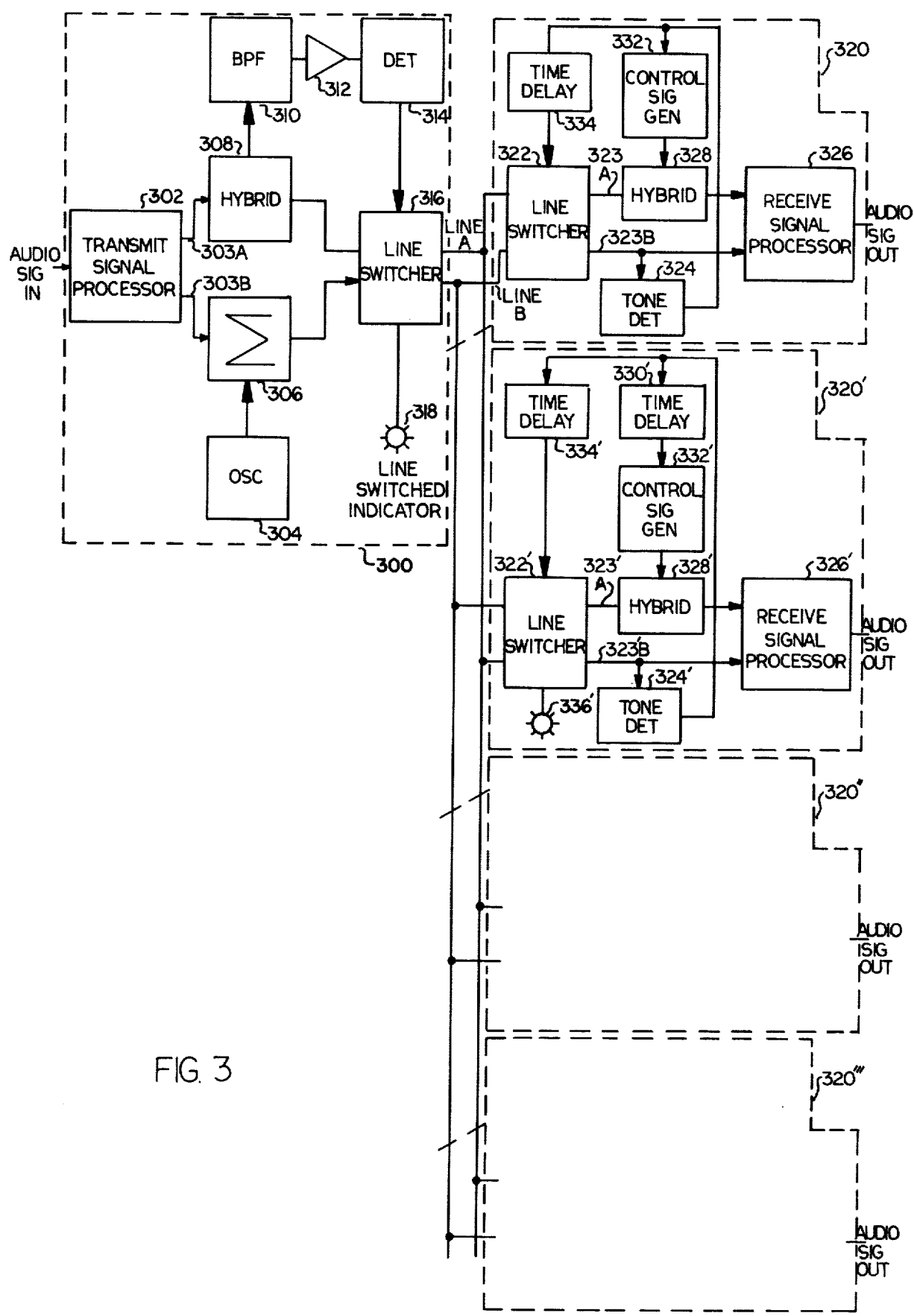
FIG. 3 shows a second embodiment of the invention with a transmitter feeding a multiplicity of receivers.

FIG. 3 shows an embodiment of the invention structured for use with a network of receivers which are fed by a single transmitter. Such multiple receiver arrangements may be used when, say, baseball games are to be broadcast by a number of radio stations located in different areas.

The audio signal to be transmitted is fed to the transmitter 300 which includes a transmit signal processor 302. Block 302 splits the input wave into segments suitable for transmission over two narrowband channels. The same circuitry as used in block 102 of FIG. 1 may be used. Actually, many of the blocks in FIG. 3 may use the same basic design as corresponding functional blocks shown in FIG. 1 and FIG. 2.

The 303B output lead of block 302, which includes most of the high intelligibility components of voice waves, feeds summation circuit 306. Also feeding block 306 is the output of oscillator 304. This oscillator produces a sinewave signal at a frequency at one of the two edges of the bandpass of the associated relatively narrowband circuits; i.e., Line A and Line B. Suitable oscillator frequencies are 300 Hz and 3,000 Hz. If signalling information is to be transmitted an FSK generator and a signal key may be provided as were elements 104 and 106 of FIG. 1.

The output of block 306 feeds one port if the Line Switcher block 316. The Line Switcher's basic function is to switch lines whenever the line, carrying the high intelligibility components of the audio signal, fails. It is controlled by detector 314 which is fed by bandpass filter 310 and amplifier 312. Filter 310 is tuned to the frequency of the control signal produced in receiver control signal generators 332, 332', 332" and other 332 series blocks. Thus, blocks 310, 312 and 314 comprise a tone detector for the tone generated in the associated receivers.

Filter 310 is fed by hybrid circuit 308 that operates in the same fashion as hybrid circuits 112 and 230 of FIGS. 1 and 2. Since it is convenient for operating personnel to know when a line has switched, a gate or relay contact in the line switcher 316 may be provided to supply current to lamp 318.

Transmitter line switch 316, which is described in detail below, connects to Lines A and B. These lines are relatively narrowband lines in comparison with the bandwidth of the signal. Typically, communications circuits would be used having a frequency response of, say, 300 to 3,000 Hz. Lines A and B connect the transmitter to receivers 320, 320', 320", etc. each of which may be located hundreds or even thousands of miles from the transmitter and from each other and, accordingly, may have significant differences in time of arrival of signals. The lines may utilize telephone cables or terrestrial or space radio relay systems. Two wire type duplex circuits are illustrated but it is possible to implement the system with two four wire circuits and somewhat reduce equipment cost by deleting the hybrid blocks 308, 328, 328', 328", etc. It is also possible to implement the system with two simplex circuits from the transmitter to the receivers and one simplex circuit from the receivers to the transmitter with some loss in operating flexibility and reliability.

If a simplex circuit is used to provide the return circuit from the receiver to the transmitter, a very narrowband circuit having a bandwidth of approximately 50 Hz may be used.

It should be noted that, except for the deletion of block 330 in receiver 320, all of the receivers may have identical block structures although the value of the time delays of blocks 334, 334', 334", etc. differ.

Lines A and B are connected to the Line Switchers 322, 322', 322", etc. of the receivers. The 323B, 323B', 323B", etc. port of Line Switcher 322, 322', 322", etc. feeds the Receive Signal Processors 326, 326', etc. These Signal Processors may use the same design as the Receive Signal Processor 232 of FIG. 2 to produce a good quality audio signal.

The 323A, 323A', etc. ports are connected to hybrid circuits 328, 328', etc.

One port of the hybrid circuit 328 feeds information generated in the receivers back to the transmitter via one of the lines. The information to be sent from the receiver to the transmitter is the condition of the line carrying the high intelligibility components; i.e., the components on lines that the line switchers connect to leads 323B, 323B', etc.

As above described, the discussion of the transmitter section of FIG. 3, a wave that is present continuously, such as a tone, accompanies the high intelligibility components of any voice waves present. Tone detectors 324, 324', 324", etc. sense the presence of this accompanying tone. The tone detectors may take the form of blocks 114, 116 and 124 of FIG. 1 except that the filter used in FIG. 3 can have a smaller bandwidth than filter 114 because only a single tone, without keying, is used in the instant embodiment of the invention, not an FSK wave as used in FIG. 1.

The output of Tone Detector 324 directly feeds control signal generator 332 in receiver 320, whereas in other receivers, 320', 320", etc. time delay circuits 330', 330", etc. are connected inbetween the tone detectors 324', 324", etc. and the control signal generators 332', 332", etc. The function of delay circuits 330', 330", etc. is discussed below.

Control signal generators may be simple audio oscillators which are keyed "on" when the tone detectors produce an output corresponding to the absence of the accompanying tone.

The output of the tone detectors also feeds time delay circuits 334, 334', 334", etc. which in turn feed line switchers 322, 322', etc. Time delay circuits 334, 334', etc. are required so as to allow the information indicating that there has been a failure of the line carrying the high intelligibility segment, to be fed to the return line to the transmitter before the lines are switched by the receiving line switchers. The same type of simple R/C circuits as used in 216 of FIG. 2 may be utilized as above described. Typically, the time delay of 334 should be in the order of 100 ms.

Thus, the time delay of blocks 334', 334", etc. would be approximately the same as 334 plus the delay of 330', 330", etc. respectively. Alternately, it is possible to connect the input of time delay circuits 334', 334", etc. with proper isolation, to the output of 330', 330", etc. respectively and use the same values of time delay for blocks 334', 334", etc. as was used for block 334.

The reason it is necessary to provide time delay blocks 330', 330", etc. may be understood by recognizing the fact that the lines (which may be telephone cables, radio relays, etc.) interconnecting transmitter 300 to the various receivers 320, 320', 320", etc. may fail at different points. Some of the failures may occur at a point, say, close to the transmitter and cause a loss of intelligible signals at all receiving points or it may occur at a point that only causes a failure for one or two receivers.

If the failure causes a failure at only one receiver there is no special requirement for blocks 330', 330", etc. However, let us assume that the line failure causes failure at receivers 320 and 320'. The control signal generators 332 and 332' would be activated sending waves through their individual hybrid circuits and line switchers. Since the nominal frequency of these waves are the same, and the oscillators are reasonably accurate, in order to avoid the requirement of providing larger than necessary bandwidth for filter 310, one should expect slow beating effects whenever signal generators 332 and 332' are both keyed on. Thus, it is possible to have an out-of-phase condition that disturbs the tone detection circuit at the transmitter, delaying the desired line switching.

However, by turning on the control signal generators at slightly different times, say, spaced by at least 100 ms, it is certain that the transmitter will receive a wave free of beating for 100 ms so as to provide time to activate operation of line switcher 316. Thus, typically, time delay block 330' would delay the control wave to block 332' for 100 ms, time delay block 330" would cause a delay of 200 ms, etc.

It is important to consider the operation of the system when one receiver, for example, receiver 320', is subject to failure of the line carrying the segment with the high intelligence bearing components and all other receivers are fed by trouble free lines. In this case, after say 100 ms from the instant that block 324' ascertains that no tone is present on lead 323B' control signal generator 332' will start generating a tone signal which will pass through hybrid circuit 328', and line switcher 322' to the transmitter via the line that passes the components which, for one example of the wideband signal segmenting procedure, covers a range of 2,500 Hz to 5,000 Hz. This may be Line A or Line B according to the latest condition of the line switchers.

When the control signal is detected by the tone detector (blocks 310, 312 and 314) line switcher 316 is caused to switch lines eliminating the loss of signal intelligibility at receiver 320'. However, because the lines were switched at the transmitter, all of the other receivers will suffer loss of correct signals. However, because the receivers' tone detectors 324, 324", etc. will sense loss of tone, line switchers 322, 322", etc. will switch restoring proper operation. As discussed below, quickly repeating control signals commanding the transmitter to switch lines (which will be sent on the corrrect line to control the transmitter as soon as the receiver's lines are switched for a period at least equal to the response time of the tone detector) will be ignored because line switcher 316 is restricted to only one operation per, say, 3 second intervals.

It is desirable to provide circuitry in the line switcher 110 of FIG. 1 as well as the line switcher 316 of FIG. 3 to restrict line switching to one operation in a period of time because of the following possible failure mode. Let us assume that the circuitry in FIG. 1 and FIG. 2 are operating satisfactorily when a noise burst appears on the line carrying the FSK wave generated in the receiver. Let us further assume that the noise burst has the proper amplitude and phase to cause cancellation of the output from rectifier 132 of FIG. 1. This would cause line switcher 110 to switch lines.

Because of the line reversal, the receiver would not receive the proper signals at points 203A and 203B and the FSK signal generated by block 104 of FIG. 1 would not reach detector 214. The receiver would then transmit a message to the transmitter instructing it to switch lines. However, this message would not be immediately received because of the reversal of the lines. However, as soon as time delay circuit 216 passed control voltage to line switcher 202 and it switched lines, the line failure message would be sent to the transmitter. This would cause transmitter line switcher 110 to operate for a second time. At that point, the system would stay in a failed condition. Therefore, additional circuitry should be provided for correcting this problem if the system is to operate reliably under such conditions. One means for correcting the problem is to provide circuitry which protects against rapid repetitive switching of line switcher 110.

Returning to FIG. 3, it should be noted that it is possible, if lines are reversed, for one of the receivers to feed the signal produced by its control signal generator to the wrong line; i.e., the line carrying the high intelligence components plus the signal produced by oscillator 304 of transmitter 300. In order to avoid low frequency beating problems during such instants it is preferable to use different frequencies for the control generators than for oscillator 304. For example, if oscillator 304 operates at 300 Hz, control signal generators 332, 332', etc. may operate at 3,000 Hz.

Under the above described conditions wherein the line feeding the high intelligible signals to receiver 320' fails, the receiver will, of course, suffer in performance because the line now carrying 2,500 Hz to 5,000 Hz components will be out of service. Nevertheless, at least an intelligible signal will be received. Station personnel receiving such reduced quality signals can then initiate procedures for replacing the defective line. It is also possible to provide automatic circuitry which, by measuring the absence of signal components in the 2,500 Hz to 5,000 Hz range, sense the problem and ring an alarm or initiate operation of an automatic dialer activating a new line so as to replace the defective line.

Normally, station personnel will, without such special circuitry, note the loss of quality in a reasonable time period and manually initiate procedures for replacing the defective line. Accordingly, since line failures are rare, automatic circuitry will not be required if station personnel are available when a failure occurs.

The above mentioned three second period is an arbitrary figure that should be acceptable for networks having less than, say, 30 stations. If larger networks are used, then the deactivation period should be in seconds 0.1 times the number of stations in the network. This allows 0.1 seconds for each station to avoid the above mentioned "beat" problem.

The above described time delay values are based upon the type of line connections shown in FIG. 3 wherein the signal always arrives at receiver 320 before receiver 320' and receiver 320' before 320" etc. If the network line feed is not so structured additional delay value for blocks 330', 330", etc. may be required.

Figure 4:
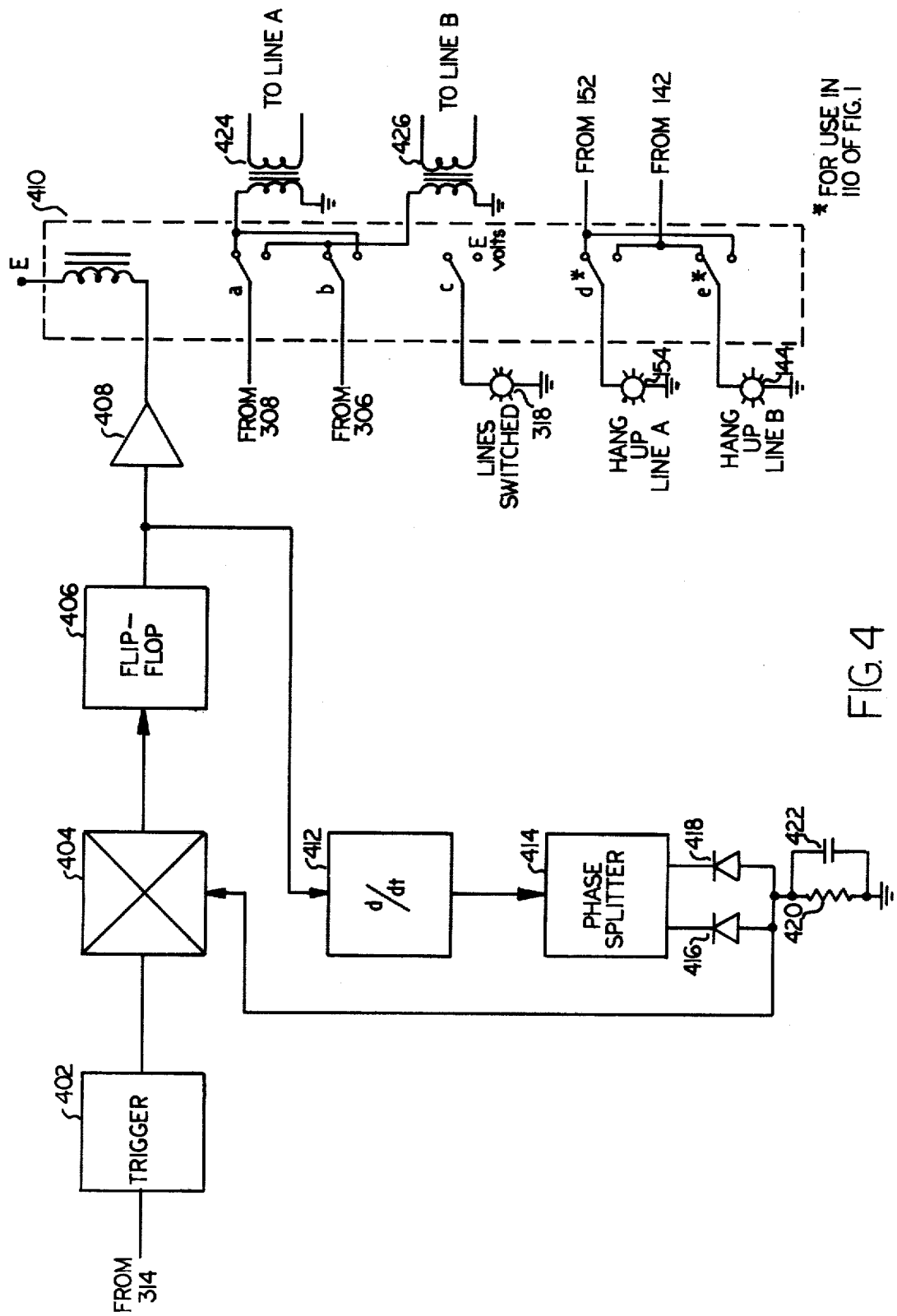
FIG. 4 shows, in block and schematic form, a detailed drawing of block 316 of FIG. 3 which may be readily modified for line switching applications for FIG. 1 and FIG. 2.

As noted above, under certain operating conditions, it is important that the transmitter does not respond to quickly repeated commands to switch lines. FIG. 4 shows one of a number of possible means for ensuring that the transmitter is inhibited from following rapidly received commands to switch lines. It should be noted that the line switchers used in the receivers need not be inhibited from rapid repeated line reversing and therefore it is unnecessary to provide the inhibiting circuitry in the receivers.

FIG. 4 is a combination block and schematic drawing of one means for providing the proper line switching operation for use in FIG. 3 (block 316) and FIG. 1 (block 110). For purposes of illustration, block 316 of FIG. 3 will be used in the description of FIG. 4. It will be apparent to those skilled in the pertinent art that, since the property of inhibiting rapid action repeated line switching is not necessary in receiver applications of the line switcher; i.e., in block 202 of FIG. 2 and blocks 322, 322', 322", etc. of FIG. 3, blocks 404, 412, 414, 416, 418, 420 and 422 of FIG. 4 may be deleted for such receiver applications. Furthermore, the hang-up lamps switching control relay contacts 410d and 410e may be deleted.

The output of Detector 314 of FIG. 3 feeds trigger circuit 402. Trigger circuit 402 produces a sharp transition waveshape when the output of detector 314 goes from the no signal condition to the signal condition. This sharp transition waveshape is desirable because it makes for more reliable operation of the flip-flop circuit 406. The output of trigger 402 feeds gate 404 which passes the output of trigger 402 to flip-flop 406 unless a negative voltage is fed to the control lead of gate 404.

The flip-flop circuit 406 is of a type that switches between two stable conditions each time that it is fed to a pulse. Such devices are sometimes called T type flip-flops. Flip-flop 406 would, for the circuit shown in FIG. 4, be activated by a positive going pulse and would ignore negative going pulses. The output of flip-flop 406 feeds amplifier 408 which amplifies the current from stage 406 so as to provide sufficient current to operate relay 410 whenever flip-flop 406 switches to the one of its stable modes requiring operation of relay 410.

When relay 410 is not activated, block 308 is connected to transformer 424 which is in turn connected to Line A. Under the same inactive relay condition, block 306 is connected to Line B through line transformer 426. Conversely, when relay 410 is activated, block 308 is switched to line B's transformer and block 306 switches to the 424 transformer and then to Line A.

When relay 410 is activated, light 318 will glow indicating that the normal connection of the lines has been reversed. The contacts D and E of relay 410 would not be required for the system shown in FIG. 3 but can be used to switch lights 144 and 154 from amplifiers 142 and 152.

As pointed out above, it is desirable to have the transmitter line switchers 110 of FIG. 1 and 316 of FIG. 3 only switch once in a short period of time, say, 3 seconds. FIG. 4 shows one method for so limiting line switcher response.

The output wave of a flip-flop 406 is differentiated by block 412 to produce a pulse every time 406 switches between the two stable states. These pulses feed phase splitter 414 which in turn feeds 416 and 418 diodes. The load for this full wave rectifier circuit is resistor 420 and capacitor 422. It will be evident that with suitable values of components (resistor 420 equals say 100,000 ohms and capacitor 422 equal to 30 uf) a peak detector results, generating a negative voltage pulse with a 3 second discharge period every time the line switcher relay is caused to switch line connections. This negative voltage can cause gate 404 to open and disconnect trigger 402 from flip-flop 406. By this procedure, the transmitter line switchers can be disabled from changing line connections in less than 3 seconds (or some other period by change of value(s) of 420 and 422).

Transformer 424 is shown connected to Line A and transformer 426 to Line B. If a suitable transformer is used in hybrid circuit 308 and if a transformer is used in summation circuit 306 transformers 424 and 426 may be deleted and the output winding of the summation circuit can feed the appropriate relay contacts. For balanced line operation two more relay contacts are required.

The line switcher in the transmitter of FIG. 1 can use the same basic arrangement shown in FIG. 4 because, as mentioned above, it is desirable to avoid having the transmitter to respond to more than one switching command in rapid order.

The same sort of circuitry shown in FIG. 4 may be used in the receivers of FIG. 2 and FIG. 3 but in these cases there is no problem regarding rapid repeated control commands. Therefore, it is unnecessary to provide blocks 404, 412, 414, 416, 418, 420 and 422 and since the receiver line switcher is activated on the loss of signal 406 flip-flop block should be caused to switch modes in a negative going edge rather than the positive edge as is the case of the transmitter's flip-flop circuit. An inverter may be used to provide the necessary polarity change. Also, the connections to the relay contacts, as well as the requirement for transformers 424 and 426, must conform to the receiver's requirements. Such required modifications will be understood by the designer skilled in the applicable art.

When the type of circuit shown in FIG. 4 is used for block 110 of FIG. 1, trigger 402 is fed by AND block 136. The trigger circuit will produce a sharp transition waveshape whenever AND block 136 goes to a positive output indicating loss of the line passing the high intelligibility components. The relay 410 contacts will then be fed by FIG. 1 blocks 112 and 108 and light 156 is controlled rather than light 318.

The invention may be used in a communications system incorporating more than two relatively narrowband lines, say three 300 to 3,000 Hz response lines, to provide relatively wideband response from 50 Hz to beyond 5,000 Hz. Such systems might be used where the response of the above described two line system is inadequate. (It will be apparent to those skilled in the art that the use of a third line cannot improve the frequency response by more than 2,700 Hz; i.e., 3,000 Hz − 300 Hz, thus extending the 5,000 Hz high end response to no more than 7,700 Hz.)

At the transmitting site means are provided for converting relatively wideband audio waves into three segments. Said means may be of the type described in patents 3,696,309 and 4,217,661. The choice of frequencies for translating the higher frequency components would be obvious to one skilled in the art. The circuitry for segmenting the high intelligibility components, which are included in the range of, for example, 50 to 2,500 Hz, are described in U.S. Pat. No. 4,217,661.

Means must also be provided for coupling the three or more segments to three or more relatively narrowband lines, such as lines having a frequency response of, say, 300 to 3,000 Hz. Suitable coupling means may be transformers of the type used in FIG. 4, block 426. The same type of transformers may be used in the receiving end of the system to couple the narrowband lines to the receiver circuitry.

Circuitry is located at the receiving site, for processing and recombining the three or more received narrowband segments so as to better approximate the original wideband waves. Such circuitry is discussed in the prior art, such as U.S. Pat. Nos. 3,696,309 and 4,217,661.

At the transmitting site, means are provided for generating a first control signal which is appreciably narrower in bandwidth than the relatively narrowband segments; i.e., appreciably less than 2,700 Hz. Means are also provided in the transmitting site for combining said first control signal with the relatively narrowband segments of the signal which includes most of the high intelligible components of voice waves present; i.e., the relatively narrowband segment covering, for example, 50 to 2,500 Hz.

Also, means are located at the receiving site for detecting the presence of the first control signal. This detecting means controls a second control signal generated at the receiving site.

The second control signal is coupled to one of the narrowband lines returning to the transmit site. This line can be any one of the narrowband lines with the exception of the line carrying the high intelligibility components because if that line fails in the transmitter to receiver direction, chances are that it will also be defective going in the opposite direction; i.e., back from the receiver to the transmitter.

The second control signal is sensed for information as to whether it has been subject to control by means at the receiving site indicating absence of the first control signal. If, indeed, the second signal conveys information that the first control signal was not received at the receiver, the transmitter is caused to switch the segment carrying the high intelligibility signals components to an alternate line which may be either the line carrying the 2,500 to 5,000 Hz components or the line carrying the highest frequency segments.

Also, means at the receiving site are provided to switch lines so as to conform with the line connections at the transmitter site at approximately the same time as the transmitter switching means is activated.

In all cases, it is understood that the above described arrangements are merely illustrative of the many possible specific embodiments which represent applications of the present invention. Numerous and other varied arrangements can be readily devised in accordance with the principles of the present invention without departing from the spirit and scope of the invention.

What is claimed is:

1. Communications equipment for transmitting from a transmitting site and receiving at a receiving site relatively wideband audio waves, using two or more relatively narrowband communications lines, said narrowband communications lines typically having, for example, a frequency response of 300 to 3,000 Hz and said lines being subject to failure and attendant interruption of service, comprising;

means, to be located at the transmitting site, for converting the relatively wideband audio waves into two or more frequency segments one of which segments includes most of the high intelligibility components of any voice waves present, the majority of said high intelligibility components typically falling above 50 Hz and below 2,500 Hz, means for coupling the two or more segments to the two or more relatively narrowband lines, means for coupling the received segments at the far end of said narrowband lines to a receiving device, means, to be located at the receiving site, for processing the received segments and recombining the segments to reconstruct a relatively wideband wave to better approximate the original wideband waves, said transmitting and receiving equipment further comprising;
- (a) means, to be located at the transmitting site, for generating a first control signal appreciably narrower in bandwidth than said frequency segments,
- (b) means, to be located at the transmitting site, for combining the signal generated by said (a) means with the narrowband segment of the signal which includes most of the high intelligibility components of any voice waves present,
- (c) means, to be located at the receiving site, for detecting the presence of the first control signal generated by said (a) means,
- (d) means, to be located at the receiving site, controlled by said (c) means, for generating a second control signal having a characteristic which is a function of the output of the (c) detecting means,
- (e) means for coupling said second control signal to a relatively narrowband line, other than the line to which the segment including most of the high intelligibility components is coupled at the transmitter site end of the line, so as to transmit said second control signal to the transmitting site,
- (f) means, to be located at the transmitting site, for sensing said characteristic of the second control signal,
- (g) means, to be located at the transmitting site, for switching the segment, which includes the high intelligibility signal components, from the communications line it is coupled to one of the two or more lines used for transmitting components other than the high intelligibility components said transmitting switching means controlled by said (f) means so as to be activated when said (c) means does not sense the presence of signal, and,
- (h) means, to be located at the receiving site, for switching lines so as to conform with the line connections at the transmitting site at approximately the same time as said (g) switching means are activated.

2. The equipment of claim 1, wherein the transmitting segmenting means produces two segments, a first segment covering a range of signal components of approximately 50 Hz to approximately 2,500 Hz which includes most of the high intelligibility components of speech waves and a second segment covering a range of signal components of approximately 2,500 Hz to approximately 5,000 Hz.

3. The equipment of claim 1 wherein said first control signal is an angular keyed wave capable of being keyed by slow speed data.

4. The equipment of claim 3 wherein the angular keyed wave is an FSK wave and the space condition of the wave is approximately 300 Hz and the mark condition is approximately 320 Hz.

5. The equipment of claim 1 wherein the second control signal comprise an FSK wave capable of being keyed by slow speed data and the characteristic which is a function of the (c) means is the presence or absence of envelope modulation of said FSK wave.

6. The equipment of claim 1 wherein the first control signal is a constant amplitude tone and the second control signal is a tone keyed on and off according to whether or not the first control signal is received at the receiving site.

7. The communications equipment of claim 1 wherein said (g) means incorporates means for ignoring switching commands for a period of time following each switching operation.

8. The communications equipment of claim 7 wherein said period of time is approximately 3 seconds.

9. Communications equipment for transmitting from a first site and receiving at a multiplicity of receiving sites a relatively wideband signal over two or more relatively narrowband lines feeding the various receiving sites said narrowband communications lines typically having, for example, a frequency response of 300 to 3,000 Hz and which are subject to occasional failures comprising;
- (a) means for segmenting and processing, at the first site, the relatively wideband signal into frequency segments suitable for transmission over said relatively narrowband lines one of said frequency segments contains at least the majority of high intelligibility components of most common speech waves, said majority of high intelligibility components typically falling above 50 Hz and below 2,500 Hz,
- (b) means for generating, at the first site, a first type of narrowband signal having a bandwidth substantially less than the bandwidth of the relatively narrowband channels and which has a center frequency suitable for frequency division multiplexing with said high intelligibility segment,
- (c) means for combining, at the first site, the first type of narrowband signal with the high intelligibility segment, (d) means for coupling, at the first site, the segments including the combined wave produced at the output of the (c) means to lines feeding a multiplicity of receiving sites,
- (e) means for detecting, at the various receiving sites, the presence of the first narrowband signal generated in the (b) means,
- (f) means for generating narrowband control signals at each of the receiving sites, and using the output of the (e) means to key these narrowband control signals when the (e) means does not detect the presence of the first narrowband signal,
- (g) means for coupling the narrowband signals generated and keyed by the (f) means to a line connected to the first site,
- (h) means, located at the first site, for detecting the narrowband keyed signals generated at the receiving sites,
- (i) means, located at the first site, for switching the line to which the combined wave produced by the (c) means to one of the alternative relatively narrowband lines when the (e) means detects the keyed condition representing a failure to detect the first narrowband signal at one or more receiving sites,
- (j) means for switching line connections at the receiving sites to conform with the new line arrangement at the first site shortly after the (e) means detects the absence of the first narrowband signal, and,
- (k) means, located at the various receiving sites, for processing and combining the received segments generated by the (a) means so as to reconstruct a wideband signal.

10. The communications equipment of claim 9 where the (i) means incorporates means for ignoring switching command for a period of time following each switching operation.

11. The communications equipment of claim 10 wherein said period of time is approximately equal in seconds to 0.1 times the number of receivers that are fed by the transmitting equipment and which can control the transmitter's line switching equipment.

12. The equipment of claim 9 wherein the (a) means for segmenting the relatively wideband signal produces two segments, a first segment covering a range of signal components of approximately 50 Hz to approximately 2,500 Hz which includes most of the high intelligibility components of speech waves and a second segment covering a range of signal components of approximately 2,500 Hz to approximately 5,000 Hz.

13. The equipment of claim 9 wherein the first type of narrowband signal is a constant amplitude tone and the second type of narrowband signal is a tone keyed on and off which is keyed according to whether or not the first type of narrowband signal is received at each individual receiving site.

14. The equipment of claim 9 wherein the first type of narrowband signal is an angular keyed wave capable of being keyed by slow speed data.

15. A method for transmitting from a first site and receiving at a multiplicity of receiving sites a relatively wideband signal over two or more relatively narrowband lines feeding the various receiving sites, said narrowband lines typically having, for example, a frequency response of 300 to 3,000 Hz and said lines subject to occasional failures, comprising;

(a) segmenting and processing, at the first site, the relatively wideband signal into frequency segments suitable for transmission over said relatively narrowband lines one of said frequency segments containing at least the majority of high intelligibility components of most common speech waves, said majority of high intelligibility components typically falling above 50 Hz and below 2,500 Hz, (b) generating, at the first site, a first type of narrowband signal having a bandwidth substantially less than the bandwidth of the relatively narrowband channels and which has a center frequency suitable for frequency division multiplexing with the frequency segment containing said high intelligibility components, (c) combining, at the first site, the first type of narrowband signal with the frequency segment containing the high intelligibility components, (d) transmitting, via said relatively narrowband lines from the first site, the segments including the combined wave as a result of said (c) step to the multiplicity of receiving sites, (e) detecting, at the various receiving sites, the presence of the first narrowband signal generated in said (b) step, (f) generating second type of narrowband signals at each of the receiving sites, and using the results of said (e) step to key these narrowband signals when the (e) step does not detect the first narrowband signal, (g) transmitting the second type of narrowband signals generated and keyed in said (f) step to the first site, (h) detecting, at the first site, the narrowband keyed signals transmitted in said (g) step, (i) switching, at the first site, the line to which the combined wave produced in (c) step is connected when said (h) step detects the keyed condition representing a failure to detect the first narrowband signal at one or more receiving sites, (j) switching line connections at the receiving sites to conform with the new line arrangement at the first site, and, (k) processing and combining, at the various receiving sites, the received segments generated in said (a) step so as to reconstruct a wideband signal.

16. A method for transmitting from a first site and receiving at a second site a relatively wideband signal over two or more relatively narrowband lines typically having a frequency response of approximately 300 to 3,000 Hz and which are subject to occasional failures, comprising;

(a) segmenting and processing, at the first site, the relatively wideband signal into frequency segments suitable for transmission over said relatively narrowband lines one of said frequency segments contains at least the majority of high intelligibility components of most common speech waves, said high intelligibility components typically falling above 50 Hz and below 2,500 Hz.

(b) generating, at the first site, a first narrowband control signal having a bandwidth substantially less than the bandwidth of the relatively narrowband lines and which has a center frequency suitable for frequency division multiplexing with the segment containing at least the majority of high intelligibility components, (c) combining, at the first site, the first narrowband control signal with the segment containing the majority of the high intelligibility components, (d) transmitting, from the first site, the segments including the combined wave produced as a result of said (c) step to a receiving point over the narrowband lines, (e) detecting, at the second site, the presence of the first narrowband signal generated in said (b) step, (f) generating a second narrowband control signal, at the second site, and using the result of said (e) step to key a characteristic of said second narrowband signal, (g) transmitting the second narrowband control signal which is keyed in said (f) step from the second site to the first site, (h) detecting, at the first site, said keying of the second narrowband control signal, (i) switching, controlled by said (h) detecting step at the first site, the transmission of high intelligibility components to a different one of the narrowband lines than presently used, (j) switching the line connections, at the second site, to conform with the new line arrangement as per said (i) step, and, (k) processing and combining, at the second site, the received segments generated in said (a) step so as to reconstruct a wideband signal.

17. Equipment for transmitting from a transmitting site relatively wideband audio waves, using two or more relatively narrowband communications lines, said narrowband communications lines typically having, for example, a frequency response of 300 to 3,000 Hz and said lines being subject to failure and attendant interruption of service, comprising;

means to be located at the transmitting site, for converting the relatively wideband audio waves into two or more frequency segments one of which segments includes most of the high intelligibility components of any voice waves present, said majority of high intelligibility components typically falling above 50 Hz and below 2,500 Hz, means for coupling the two or more segments to the two or more relatively narrowband lines for transmitting the segments to one or more receiving sites, where the received segments are processed and recombined to reconstruct a relatively wideband wave and to better approximate the original wideband waves, said transmitting equipment further comprising;

(a) means for generating a first control signal appreciably narrower in bandwidth than said frequency segments, said first control signal providing a constantly available signal to allow the associated receiving equipment to determine when the line transmitting the high intelligibility components fails, (b) means for combining the signal generated by said (a) means with the narrowband segment of the signal which includes most of the high intelligible components of any voice waves present, (c) means for sensing the characteristic of a second control signal generated at a receiving site indicating that the line carry the high intelligibility components failed and the first control signal was not received, and (d) means for switching the segment, which includes the high intelligibility signal components, from the communications line to which it is coupled to one of the alternate communications lines, said transmitting switching means controlled by said (c) means so as to be activated when the associated receiver does not sense the presence of the first control signal.

18. Equipment for receiving relatively wideband audio waves, using two or more relatively narrowband communications lines, said narrowband communications lines typically having, for example, a frequency response of 300 to 3,000 Hz and said lines being subject to failure and attendant interruption of service, comprising;

means for coupling segments received from a transmitter site to receiving circuitry, said segments produced at the transmitter site by converting relatively wideband audio waves into two or more frequency segments one of which segments includes most of the high intelligibility components of any voice waves present, said majority of high intelligibility components typically falling above 50 Hz and below 2,500 Hz, means for processing said segments and recombining the segments to reconstruct relatively wideband waves and to better approximate the original wideband waves, said receiving equipment further comprising;

(a) means to be located at the receiving site, for detecting the presence of a first control signal said first control signal transmitted from the transmitting site over the same line used to transmit most of the high intelligibility components.

(b) means also to be located at the receiving site, controlled by said (a) means, for generating a second control signal having a characteristic which is a function of the output of said (a) detecting means, (c) means for coupling said second control signal to one of the relatively narrowband line, other than the line to which the segment including most of the high intelligibility components was coupled at the transmitter site end of the line, so as to transmit the second control signal to the transmitting site, said second control signal capable of causing circuitry at the transmitter site to switch the segment which includes the high intelligibility signal components from the communications line it is coupled to, to one of the alternate communications lines, and, (d) means for switching lines so as to conform with the expected line connections at the transmitting site at approximately the same time as the transmitter switches lines.

* * * * *